UNITED STATES PATENT OFFICE.

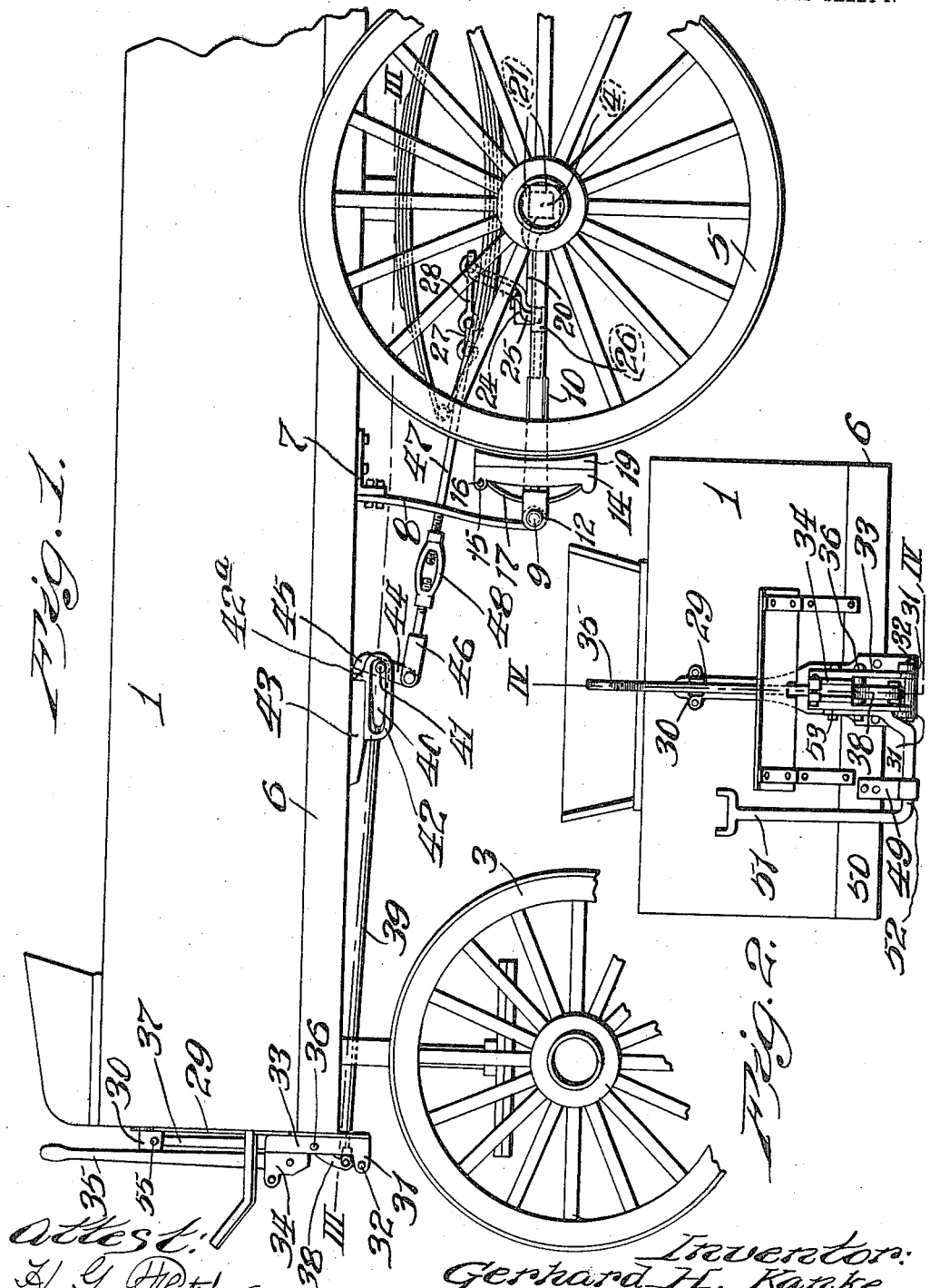

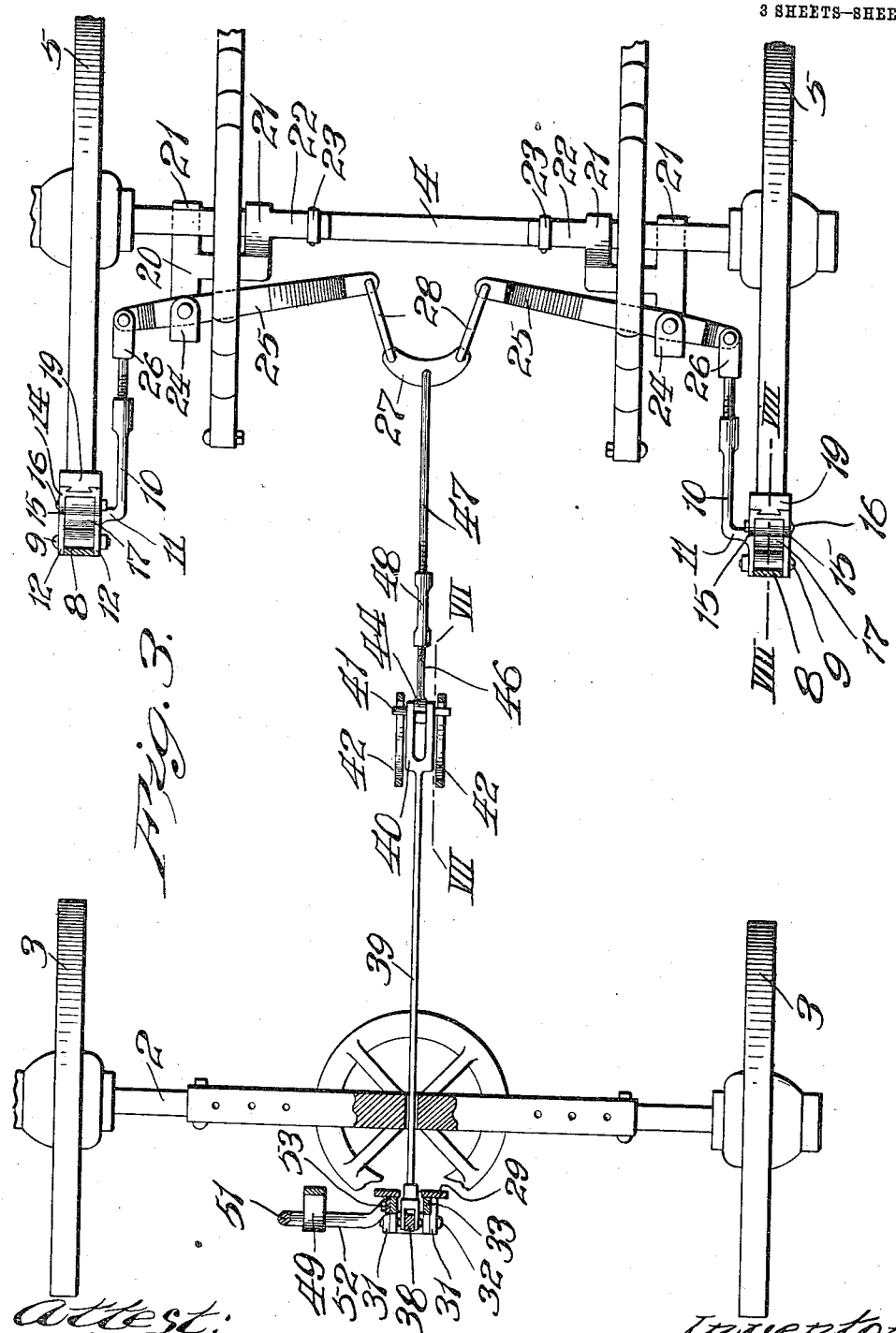

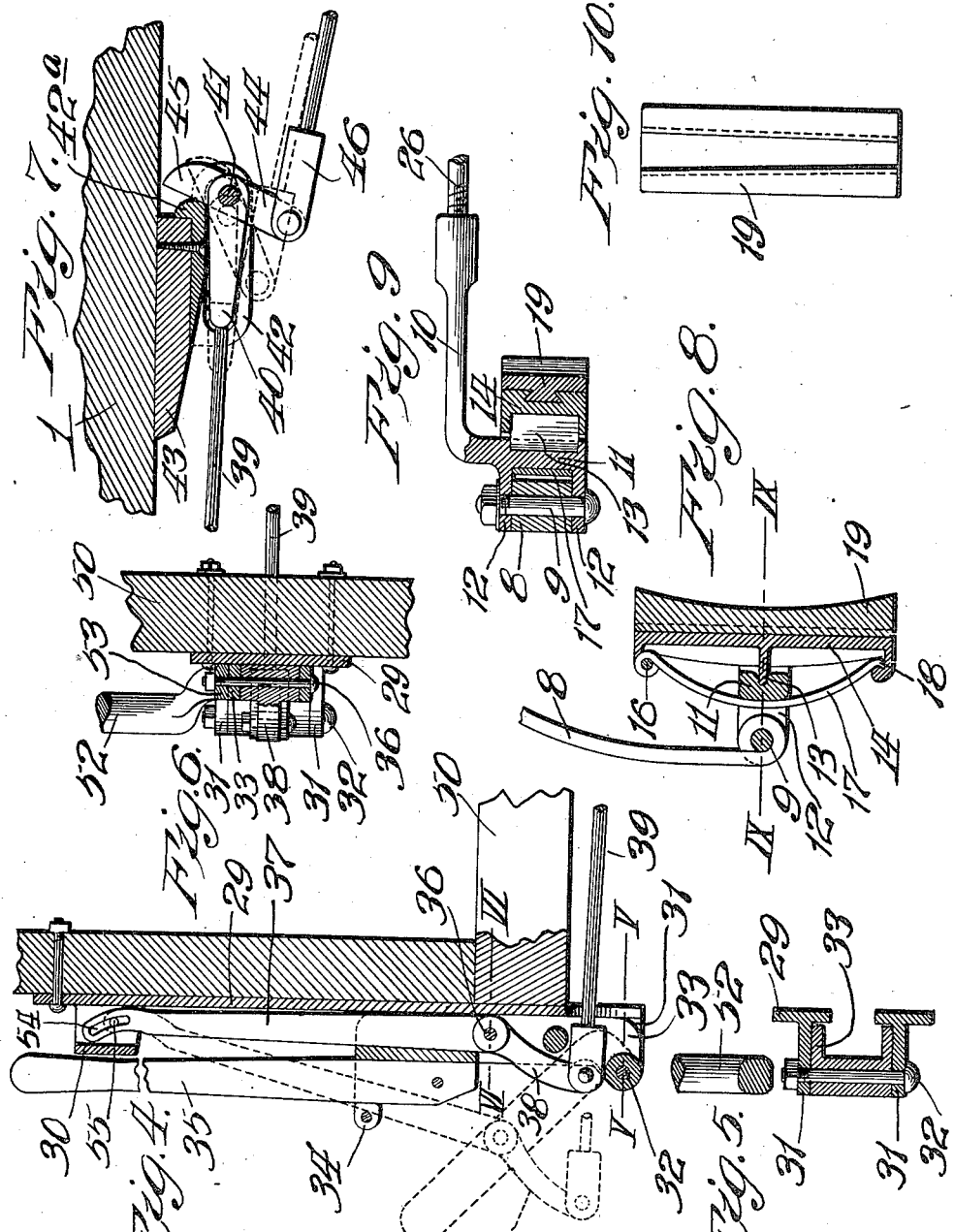

GERHARD H. KANKE, OF ST. LOUIS, MISSOURI.

VEHICLE-BRAKE.

1,063,266.  Specification of Letters Patent.  Patented June 3, 1913.

Application filed July 19, 1911.  Serial No. 639,350.

*To all whom it may concern:*

Be it known that I, GERHARD H. KANKE, a citizen of the United States of America, residing in the city of St. Louis and State of Missouri, have invented certain new and useful Improvements in Vehicle-Brakes, of which the following is a specification.

This invention relates to a brake system for vehicles, and has for its primary object to provide an improved construction, combination and arrangement of parts in devices of this character.

One of the objects of the present invention is to provide an improved system of levers, arranged in groups, whereby the leverage action may be compounded and the movement of the system amplified without necessitating a corresponding amplification in the movement of the lever by which the power is applied.

Another object of the invention is to provide an improved resilient mounting for the brake shoe holders, and an improved construction of said holders.

More specifically, one of the objects is to provide an improved construction, combination and arrangement of parts in what, for the want of a better name, may be termed the power application system of levers.

Another specific object is to provide improved means for mounting the brake leverage system.

Another object is to provide improved multiplying connection between the brake leverage group and the power applying group systems.

Other and further objects will appear in the specification and be specifically pointed out in the appended claims, reference being had to the accompanying drawing forming part of this specification.

Figure 1 is a side elevation of a wagon with my improved braking system applied thereto. Fig. 2 is a front elevation of the upper portion of the same. Fig. 3 is a section on the line III—III, Fig. 1. Fig. 4 is a section on the line IV—IV, Fig. 2. Fig. 5 is a section on the line V—V, Fig. 4. Fig. 6 is a section on the line VI—VI, Fig. 4. Fig. 7 is an enlarged detail section on the line VII—VII, Fig. 3. Fig. 8 is an enlarged detail section on the line VIII—VIII, Fig. 3. Fig. 9 is an enlarged detail section on the line IX—IX, Fig. 8. Fig. 10 is a detail rear elevation of the brake shoe holder.

Referring more particularly to the drawings, and to the exemplification of the invention shown therein, the wagon to which my improved braking system has been applied comprises the body 1, provided with a front axle 2 with its wheels 3, and a rear axle 4 with its wheels 5. Upon each of the side walls 6 of the wagon is mounted a bracket 7, from which depends a brake shoe hanger 8 constructed of resilient material, preferably of spring metal. Pivotally mounted within the lower end of the hanger 8 by means of a bolt 9 (as shown best in Fig. 9) is a draw rod 10 whose offset end 11 is provided with forwardly projecting lugs 12 through which the bolt 9 extends. The rear face of the offset end 11 is provided with a groove into which the rounded edge of a rib 13 on the brake shoe holder 14 projects. Upon the upper end of the holder 14 is provided a pair of perforated lugs 15 for receiving a bolt 16, upon which the upper end of a bow-spring 17 is pivoted, said bow-spring being provided with a hooked extremity 18 which engages in the recess formed at the lower end of the holder 14. Said spring 17 is thus drawn snugly against the front curved face of the offset 11 of the draw rod 10. This construction provides a resilient support for the holder 14 which permits it to adjust itself, with the brake pad 19, on the wheel 5 when the brakes are applied. The resilient hanger 8, on the other hand, imparts a constant tendency to separate the brake holder, with its shoe 19, from the wheel, so that when there is no positive power applied to the braking systems, the brakes are normally and automatically made inoperative.

In order to provide means for mounting what may be termed the brake leverage system, which will presently be described, without weakening the rear axle 4, I provide a pair of brackets 20 of peculiar form, each of said brackets (as shown best in Fig. 3) comprising spaced clamping arms 21 with deflected ends for engaging the rear face of the axle 4. One of said arms is provided with a lateral projection 22 extending longitudinally along the axle 4, being clamped to the axle by means of a band 23. In the forwardly extending yoke 24 of each bracket 20 is pivotally mounted a lever of the first-class 25, the force arm of which is pivotally connected to an adjustable portion 26 of the draw rod 10. A crescent shaped member 27 serves to equalize the movement imparted to the power arms of the levers 25 through connecting links 28.

The power application group of levers will now be described.

Secured to the front board of the wagon is an elongated bracket 29 provided with an upper socket 30 and a pair of forwardly projecting fulcrum arms 31 at its lower end. Movable about a pivot 32 is an operating lever comprising a yoke 33 provided with a socket 34 for the reception of a handle 35. A pin 36 carried by the side boards of the yoke 33 serves to pivotally support a transmission lever 37, said transmission lever being provided at its lower end with a forwardly curved arm 38. A connecting rod 39 has its forward end pivotally connected with the arm 38 of the transmission lever 37, the rear end of said rod 39 being provided with a cross head 40 in the form of a fork (see Fig. 3), the rear ends of said fork having a cross head pin 41 extending therethrough and projecting on either side to slidably mount said cross head in the slides 42 which are secured to a block 43 on the body of the wagon. Pivotally mounted upon the pin 41, and between the arms 42 of the cross head 40, is a link 44 provided with a tappet arm 45 which, when the connecting rod 39 is drawn forward, is drawn into engagement with the rear end of the block 43, so that the link 44, while it is being drawn forward, at the same time swings about the pivot 41 until it lies flat against the lower face of the block 43. By this movement, the lower end of the link 44 has imparted to it a combined reciprocatory and rotary movement. This movement is transmitted directly to the equalizer 27 through a connection comprising a rod end 46, a rod 47, and a turnbuckle 48, whereby said connection may be lengthened or shortened at will.

In order to adapt the braking mechanism to be operated by foot power, a bearing bracket 49 may be secured to the front sill 50 of the wagon (see Fig. 2) for mounting a foot lever 51, said foot lever being provided with a lateral offset 52 which may be journaled in the bracket 49 co-axially with the pivotal support of the yoke 33. A plate 53 formed integral with the offset portion 52 serves to connect the foot power lever 51 with the yoke 33.

With this description, the operation and advantages of my improved braking mechanism will be readily understood. When power is applied through the operating lever, the parts in the power applying group of levers are moved into the relative positions shown by dotted lines Fig. 4. During this movement, the pivotal connection between the arm 38 and the connecting rod 39 moves in substantially a straight line forward. By reason of the angular movement of the pivot 36 and the upper end of the transmitting lever 37 being provided with a slot 54 through which a pin 55, extending through the side walls of the socket 30 at the upper end of the bracket 29, slides. By means of this construction, it will be evident that the forward end of the connecting rod is caused to move considerably farther than the pivot 36, the braking movement being, therefore, considerably amplified. This movement is further multiplied by means of the cross head 40 drawing the link 44 flat against the block 43, the swinging movement of the link 44 serving to add to the reciprocatory movement of the connecting rod 39 an additional movement approximately equal to the distance between the pivot 41 and the pivotal connection between link 44 and rod end 46. As seen best in Fig. 3, this movement is imparted by rod 47 to the equalizer 27 which permits an equalization between the levers 25. During this movement, which overcomes the resistance of the resilient hangers 8, the holders 14 with their brake shoes 19 are driven against the rear wheels 5, the resilient support 17 permitting a circumferential adjustment to said wheels. As shown in Figs. 3 and 10, the brake shoes 19 are provided with a downwardly wedged dove-tailed slot connection with the holders 14, so that the frictional action of the wheels 5 thereon will tend to lock them more securely in position. At the same time, they can be readily removed for renewal purposes.

What I claim is:

1. In a device of the character described, the combination with a pair of rods through which power is transmitted to a braking system, one of said rods being provided with a cross head, of a link pivotally connected intermediate of its ends with said cross head, and at one end pivotally connected with the other rod, and means for engaging the free end of said link to impart a swinging movement thereto during its reciprocatory movement under the action of said cross head.

2. In a device of the character described, the combination with a power transmitting connecting rod provided with a cross head, of guides for said cross head, a link pivotally connected to said cross head intermediate of its ends, a system of brake levers operably connected to one end of said link, and means connected with said cross head guides for impinging the free end of said link to oscillate it about its pivot as said pivot reciprocates.

3. In a device of the character described, the combination with an axle, of a bracket provided with arms engaging the upper and lower faces of said axle, said arms being provided with upwardly and downwardly deflected ends to hold the bracket against displacement, an arm extending longitudinally of said bracket, means for clamping the last said arm to said axle, and a brake operating lever pivotally mounted on said bracket.

4. In a device of the character described, the combination with a system of brake operating levers including a power transmitting connecting rod, of a transmission lever pivotally connected to one end of the connecting rod, said transmission lever being pivotally mounted on a moving axis and connected to said system of brake operating levers, and means for applying power to said power transmitting connecting rod.

5. In a device of the character described, the combination with a braking apparatus including a power transmitting connecting rod, of an operating lever pivotally mounted, a transmission lever pivotally connected at one end with said connecting rod, said transmission lever being pivotally supported by said operating lever at a distance from the pivotal axis of the latter, and means for movably retaining the upper end of said transmission lever.

6. In a device of the character described, the combination with a braking apparatus including a power transmitting connecting rod, of an operating lever pivotally mounted, a transmission lever pivotally connected at one end with said connecting rod, said transmission lever being pivotally supported by said operating lever at a distance from the pivotal axis of the latter, and means for movably retaining the upper end of said transmission lever; the lower end of said transmission lever being curved forwardly, and said operating lever being provided with means for limiting the inward and outward movement of said transmission lever.

7. In a device of the character described, the combination with a front board, of a vehicle, of a bracket secured thereto, an operating lever comprising a yoke pivotally mounted adjacent the lower end of said bracket, a handle secured to said yoke, a transmitting lever pivotally mounted between the arms of said yoke; said lever being provided with a forwardly arched work arm, and a comparatively long upwardly projecting slide arm, and a connecting rod pivotally connected to the lower end of said arched arm.

8. In a device of the character described, the combination with a pair of rods through which power is transmitted to a braking system, one of said rods being provided with a cross head, said cross head being mounted in the guide block of a link pivotally connected intermediate of its ends with said cross rod and at one end pivotally connected to the other rod, the opposite end of said link engaging said guide block to impart swinging movement to said link as said cross head is moved forward.

GERHARD H. KANKE.

In the presence of—
  M. C. HAMMON,
  H. G. FLETCHER.

---

Copies of this patent may be obtained for five cents each, by addressing the "Commissioner of Patents, Washington, D. C."